United States Patent
Hasek et al.

(10) Patent No.: US 8,566,887 B2
(45) Date of Patent: Oct. 22, 2013

(54) CAPTION DATA DELIVERY APPARATUS AND METHODS

(75) Inventors: Charles Hasek, Broomfield, CO (US); Kenneth Gould, Oakton, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 1515 days.

(21) Appl. No.: 11/298,247

(22) Filed: Dec. 9, 2005

(65) Prior Publication Data
US 2007/0136777 A1   Jun. 14, 2007

(51) Int. Cl.
*H04N 7/173* (2011.01)

(52) U.S. Cl.
USPC .......................................................... 725/94

(58) Field of Classification Search
USPC .......................................................... 725/94
See application file for complete search history.

(56) References Cited

U.S. PATENT DOCUMENTS

| | | | |
|---|---|---|---|
| 5,327,176 A | 7/1994 | Forler et al. | |
| 5,790,842 A * | 8/1998 | Charles et al. | 713/600 |
| 6,061,056 A * | 5/2000 | Menard et al. | 715/704 |
| 6,240,555 B1 | 5/2001 | Shoff et al. | |
| 6,256,072 B1 | 7/2001 | Bae | |
| 6,513,003 B1 | 1/2003 | Angell et al. | |
| 6,564,383 B1 | 5/2003 | Combs | |
| 6,587,153 B1 | 7/2003 | Unemura | |
| 6,615,175 B1 | 9/2003 | Gazdzinski | |
| 6,674,767 B1 * | 1/2004 | Kadyk et al. | 370/466 |
| 6,766,163 B1 | 7/2004 | Sharma | |
| 6,771,302 B1 | 8/2004 | Nimri et al. | |
| 6,772,435 B1 * | 8/2004 | Thexton et al. | 725/91 |
| 6,903,779 B2 | 6/2005 | Dyer | |
| 6,928,656 B1 | 8/2005 | Addington | |
| 7,009,657 B2 | 3/2006 | Mitts | |
| 7,035,804 B2 | 4/2006 | Saindon | |
| 7,102,688 B2 | 9/2006 | Hayes | |
| 7,130,790 B1 | 10/2006 | Flanagan | |
| 7,139,032 B2 | 11/2006 | Unemura | |
| 7,142,892 B2 | 11/2006 | Dennis et al. | |
| 7,324,003 B2 | 1/2008 | Yun | |
| 2002/0015106 A1 * | 2/2002 | Taylor, Jr. | 348/465 |
| 2002/0038460 A1 * | 3/2002 | Kimoto | 725/109 |
| 2002/0140863 A1 * | 10/2002 | Park, II | 348/569 |
| 2002/0147984 A1 * | 10/2002 | Tomsen et al. | 725/109 |
| 2002/0171760 A1 * | 11/2002 | Dyer | 348/468 |
| 2002/0194592 A1 | 12/2002 | Tsuchida et al. | |
| 2003/0121036 A1 | 6/2003 | Lock et al. | |
| 2003/0182429 A1 * | 9/2003 | Jagels | 709/227 |
| 2003/0182620 A1 | 9/2003 | Errico et al. | |
| 2003/0206549 A1 * | 11/2003 | Mody et al. | 370/390 |
| 2003/0217365 A1 | 11/2003 | Caputo | |
| 2003/0219104 A1 | 11/2003 | Malik | |
| 2003/0227976 A1 * | 12/2003 | Okada et al. | 375/240.25 |

(Continued)

*Primary Examiner* — Nicholas Corbo
(74) *Attorney, Agent, or Firm* — Gazdzinski & Associates, PC

(57) ABSTRACT

Apparatus and methods for efficiently and flexibly providing caption data (e.g., closed captioning) to subscribers of a content-based network, such as for example Internet protocol television (IPTV) subscribers. In one exemplary embodiment, the apparatus includes a server performing real-time extraction and encapsulation of caption data, transport of caption data to client devices over the network, and use of one or more applications running on the client devices to decode and display the caption data consistent with the multimedia (audio/video) content with which it is associated. In one variant, instant messaging (IM) infrastructure is used to authenticate clients and receive and display the caption data via a separate transport process. Server and client-side apparatus adapted for caption data receipt, decoding and display are also disclosed.

22 Claims, 9 Drawing Sheets

(56) References Cited

U.S. PATENT DOCUMENTS

| | | | |
|---|---|---|---|
| 2004/0042479 A1* | 3/2004 | Epstein et al. | 370/432 |
| 2004/0158870 A1* | 8/2004 | Paxton et al. | 725/115 |
| 2004/0181811 A1 | 9/2004 | Rakib | |
| 2004/0249944 A1* | 12/2004 | Hosking et al. | 709/225 |
| 2005/0015799 A1 | 1/2005 | Park | |
| 2005/0162267 A1* | 7/2005 | Khandelwal et al. | 340/506 |
| 2005/0188411 A1* | 8/2005 | Dacosta | 725/110 |
| 2005/0210511 A1* | 9/2005 | Pettinato | 725/61 |
| 2005/0246758 A1 | 11/2005 | Khandelwal et al. | |
| 2006/0040639 A1 | 2/2006 | Karl | |
| 2006/0156343 A1* | 7/2006 | Jordan | 725/50 |
| 2007/0004377 A1 | 1/2007 | Medford et al. | |
| 2007/0033531 A1 | 2/2007 | Marsh | |
| 2007/0136743 A1 | 6/2007 | Hasek | |
| 2007/0207771 A1 | 9/2007 | Bowser et al. | |

* cited by examiner

CAPTION DATA DELIVERY APPARATUS AND METHODS

RELATED APPLICATIONS

This application is related to co-owned U.S. patent application Ser. No. 11/299,169 filed contemporaneously herewith and entitled "EMERGENCY ALERT DATA DELIVERY APPARATUS AND METHODS", which is incorporated herein by reference in its entirety.

BACKGROUND OF THE INVENTION

1. Field of Invention

The present invention relates generally to the field of delivery of digital multimedia program and associated data over networks such as the Internet, and specifically in one aspect to delivering closed captioning data in a broadcast "IPTV" network.

2. Description of Related Technology

The term "closed captioning" (CC) generally refers to the display of text, data and/or musical notations on a video display, such as the display of the audio portion of a television program. The CC text or data is typically synchronized with the presentation of the audio that the text is representing. The support of CC display capability has been a feature supported by most all televisions sold within the U.S. for many years.

Closed captioning for television programs is typically generated by having a typist (or a speech recognition system) transcribe the text by listening to the audio from a recorded program, and entering that information into a system that adds the textual information into the vertical blanking interval (VBI) which is then embedded with the final recorded version of the video program. Alternatively, a pre-existing script or text file for the program can be used as the basis of the CC display. The same approaches apply to embedding the CC information on VHS or DVD media.

A slightly different scenario may apply for "live" TV programs such as local or national news broadcasts. In these cases, a typist might be entering the CC information to the VBI information transmitted with the newscast as the newscast occurs. As a result, closed captioning for live programming tends to appear on the screen several seconds after the associated audio and typically contain many typographical errors. Again, a pre-existing script for the program can be used to avoid the aforementioned latency, although deviations between the pre-existing script and the actual live performance may occur.

Recently, network operators have begun using Internet protocol (IP) networks to distribute broadcast television programming to subscribers. This is to be contrasted with more traditional radio frequency (over-the-air) broadcasts, or delivery via packetized MPEG-2 program streams. Such IP delivery of broadcast television programming also requires a method for the delivery of CC data to subscriber units such as personal computers (PC), as well as a method to display such information on the display monitor of these units.

In analog television distribution systems, CC data is transmitted in the Vertical Blanking Interval (VBI) of the television signals. The VBI lines are also used for transmitting useful data other than CC; notably including Vertical Interval Test Signals (VITS) and Extended Data Services (EDS) including teletext information.

Most digital television distribution systems in operation use MPEG-2 transport format for distribution of broadcast television programs. In such systems, CC and VBI data is transmitted in digitized bit representation along with audio/video. The two most commonly employed methods are to send CC data as a part of the video picture user data, or to send CC data with its own packet ID (PID) within an MPEG stream.

In the emerging Internet protocol television (IPTV) and similar distribution networks including for example so-called "Broadband TV" and "TV-over-DOCSIS" delivery paradigms, a wider choice of audio/video codecs is being considered. For example, MPEG-2, MPEG-4/H.264 (advanced video codec or "AVC"), Windows Media Codec by Microsoft, and RealVideo by Real Networks are a few of the possible audio/video compression formats that have been deployed. While these new formats and their associated compression technology is useful in providing streaming audio/video programs to end users, most formats do not support simultaneous caption data delivery. While some video codecs have the ability to embed CC information within the video stream (MPEG-2/MPEG-4, etc.), many video codecs do not (e.g., RealVideo).

Accordingly, what is needed is the ability to transport the CC information to the display client outside of the associated video stream. There are some existing solutions for this problem, for example Microsoft's SAMI (Synchronized Accessible Media Interchange) solution provides a technique that makes off-line processing of multimedia files and generation of corresponding CC data possible. This type of solution has limited usefulness in a live broadcast environment, however, as it requires significant manual pre-processing of the CC data in order to create an out-of-band CC data feed for the Windows Media Player client.

A variety of other approaches to closed captioning of data are evidenced in the prior art. For example, U.S. Pat. No. 6,240,555 issued May 29, 2001 to Shoff, et al entitled "Interactive entertainment system for presenting supplemental interactive content together with continuous video programs" discloses an interactive entertainment system that enables presentation of supplemental interactive content along side traditional broadcast video programs. The programs are broadcast in a conventional manner. The supplemental content is supplied as part of the same program signal over the broadcast network, or separately over another distribution network. A viewer computing unit is located at the viewer's home to present the program and supplemental content to a viewer. When the viewer tunes to a particular channel, the viewer computing unit consults an electronic programming guide (EPG) to determine if the present program carried on the channel is interactive. If it is, the viewer computing unit launches a browser. The browser uses a target specification stored in the EPG to activate a target resource containing the supplemental content for enhancing the broadcast program. The target resource contains display layout instructions prescribing how the supplemental content and the video content program are to appear in relation to one another when displayed. When the data from the target resource is downloaded, the viewer computing unit is responsive to the layout instructions obtained from the target resource to display the supplemental content concurrently with the video content program. Embedding the layout instructions in the supplemental content places control of the presentation to the content developers.

U.S. Pat. No. 6,766,163 issued Jul. 20, 2004 to Sharma entitled "Method and system of displaying teletext information on mobile devices" discloses a communication system and method for communicating teletext information to mobile stations. A wireless access protocol (WAP) server is coupled to a television station and receives a signal which includes teletext information from the station. The WAP server includes a teletext decoder which decodes the teletext information in the transmitted signal. The decoded information is stored in memory using a server controller. The controller receives information requests from a network interface coupled to the mobile stations. The controller accesses the teletext information stored in memory and transmits the information to the mobile station through the network interface.

U.S. Pat. No. 6,771,302 issued Aug. 3, 2004 to Nimri, et al entitled "Videoconference closed caption system and method" discloses a system and method for closed caption in a videoconference environment. In a method according to one embodiment of the invention, a connection is established with a videoconference device. Subsequently, a closed caption page associated with the videoconference device is selected. Text is then entered on the closed caption page. The text is displayed to at least one device associated with a videoconference in which the videoconference device is participating.

U.S. Pat. No. 6,903,779 issued Jun. 7, 2005 to Dyer entitled "Method and system for displaying related components of a media stream that has been transmitted over a computer network" discloses a system and method for displaying related components of a media stream that has been transmitted over a computer network that includes at least one storage device that communicates with a television decoder and with the video display. Information from one or more components of the media stream is extracted from the media stream and delivered to one or more storage devices. This stored component is subsequently transmitted to the video display in response to an information release signal that is embedded in the information. The invention can be used to display closed caption and other information with associated audio and video signals using an audio-visual media player.

A non-real time CC generation technique ("CaptionSync™") is available from Automatic Sync Technologies, LLC that provides the ability to produce CC data in RealText format by analyzing a RealVideo file of compressed video program. Due to the off-line processing involved, this technique cannot be applied to real time broadcast television.

From the foregoing, it is clear that while the prior art has generally recognized the need to extract CC data from television signals, the need to (i) provide CC data to client devices over networks (e.g., IP networks), and (ii) the need to enable CC decode and display capability along with a digital audio/video decoder on a client device, it fails to address several issues pertaining to IPTV deployments. For example, when CC data is embedded with packets belonging to a particular video format, decoders that wish to receive video in another format cannot make use of this CC data stream. This requires that the IPTV operator repeat CC data for each different video format anticipated in the network.

Similarly, in a managed IP network (e.g., DOCSIS), due to a priori knowledge about performance (e.g., packet propagation delays) of each element in the system, CC delivery and synchronization mechanism can be simplified such that two independent client software programs that do not necessarily share time information can be deployed; one for audio/video decoding and the other for CC data decoding.

Moreover, the prior art fails to make effective use of the pervasive connectivity of an IP network to distribute various functions of CC data extraction, streaming, service authentication etc. across multiple servers located at different locations and communicating with each other over the IP network.

Furthermore, the prior art solutions lack adequate flexibility with regard to allowing selective implementation of one or more business policies related to selectively offering CC data service to subscribers, service classification (e.g., amount and type of VBI data delivered to a user), etc.

Accordingly, what is needed are apparatus and methods that provide a mechanism for receiving multiple channels of baseband video in real-time from the content providers (typically received via satellite or some local origination source), encoding that video in real time, extracting the CC data at the time of encoding, passing that CC data to a CC streaming server as it is extracted, and delivering that data to the end-user's PC application for display as the associated video/audio is delivered. Such apparatus and methods should be preferably deployable over a packet-switched network (such as an IP network), such that subscribers can use the service by using commonly available PC or similar software applications. In order to increase utility in the broadcast television environment, such apparatus and methods should provide for the extraction of CC data from broadcast television signals in real time, and for transfer of the extracted data to users over the IP network.

These methods and apparatus should also ideally permit optimization of network bandwidth by providing broadcast/multicast transmission capability of CC data, and eliminating the need to send CC data packets over the IP network when no client device has requested it.

SUMMARY OF THE INVENTION

The present invention addresses the foregoing needs by providing, in various embodiments, methods and apparatus for providing closed captioning data over networks such as IPTV networks.

In a first aspect of the invention, a system for distribution of content and associated caption over a packet-switched network is disclosed. In one embodiment, the system comprises: a content source adapted to generate content including associated caption data; a caption data extractor unit; a caption data server in data communication with the extractor unit; a streaming server in data communication with the data server; and at least one client device in data communication with the streaming server and the data server, the at least one client device configured to receive the content from the streaming server and the caption data from the caption data server. In one variant, the packet-switched network comprises the Internet, and the system further comprises: a messaging server in communication with the data server; a web server; an authentication server; and a messaging client application running on the at least one client device; the application in data communication with at least the messaging server and the web server.

In a second aspect of the invention, a method of delivering caption data to one or more client devices of a packet-switched network is disclosed. In one embodiment, the network comprises at least one multimedia server configured to send multimedia programs, at least one data server different from the multimedia server configured to send the caption data associated with one or more of the multimedia programs, and a plurality of client devices in direct or indirect signal communication with the servers, and the method comprises: extracting the caption data from the one or more multimedia programs; buffering the caption data for a first duration; formatting the caption data in a format suitable for transport over the network; and delivering the caption data to the one or more client devices over the network.

In a third aspect of the invention, consumer equipment adapted for use within an IPTV network is disclosed. In one embodiment, the equipment comprises: a multimedia content decoder and display unit; a computer program configured to determine the availability of caption data associated with the multimedia content; a computer program configured to receive and decode the caption data; a computer program configured to display the decoded caption data; and a computer program configured to substantially synchronize the caption data with the multimedia content. In one variant, the consumer equipment further comprises an RF tuner adapted to tune to at least one radio frequency channel on a cable or satellite network, the multimedia content decoder being in direct or indirect signal communication with the tuner.

In a fourth aspect of the invention, network server apparatus for use in a network is disclosed. In one embodiment, the network comprises an IPTV broadcast network having a plurality of client devices, and the apparatus comprises: an extraction unit configured to remove caption data from incoming television signals; a storage unit configured to buffer the removed caption data; a formatting unit configured to process the removed caption data; and a delivery unit configured to deliver the caption data on the IPTV network to the client devices.

In a fifth aspect of the invention, apparatus capable of providing caption data to a plurality of client devices receiving content transmitted over a network (such as an internet or intranet). In one embodiment, the network comprises the Internet, and the apparatus comprises: a processor adapted to run at least one computer program thereon; a storage device in data communication with the processor, the storage device being adapted to store a plurality of data relating to the configuration of individual ones of the plurality of client devices; and a computer program running on the processor and adapted to selectively switch one of a plurality of broadcast content streams to groups of ones of the plurality of client devices based at least in part on the plurality of data.

In a sixth aspect of the invention, a method of delivering the caption data to one or more client devices of a packet-switched network is disclosed. In one embodiment, the network comprises at least one multimedia server configured to send multimedia programs, at least one data server configured to send caption data associated with one or more of the multimedia programs, and a plurality of client devices in direct or indirect signal communication with the servers, and the method comprises: extracting the caption data from the one or more multimedia programs; formatting the caption data in a format suitable for transport over the network; delivering the one or more multimedia programs to the one or more client devices over a first transport stream associated with a first process running on the one or more client devices; and delivering the caption data to the one or more client devices over a second transport stream different from the first and associated with a second process running on the same ones of the one or more client devices on which the first process is running.

In a seventh aspect of the invention, a method of doing business within content-based network comprising at least one server and a plurality of consumer premises equipment (CPE) in direct or indirect signal communication therewith is disclosed. In one embodiment, the method comprises: providing caption data services to a plurality of subscribers associated with respective ones of the plurality of CPE; causing each of the CPE to possess an identifying parameter; identifying user-selected content to be delivered to one or more of the CPE; delivering the selected content to the one or more CPE; and selectively delivering caption data to the one or more CPE, the selective delivery based at least in part on the identifying parameter. In one variant, the act of selectively delivering caption data comprises selectively formatting and transmitting the caption data to the one or more CPE is based at least in part on correlation of the identifying parameter with at least one of the at least two tiers or service levels of the data services.

In an eighth aspect of the invention, a method of delivering content and caption data to a client device a content-based packet-switched network is disclosed. In one embodiment, the method comprises: allocating the media to a first transport stream different than, but substantially synchronized with, a second transport stream to which the caption data is allocated; and processing the first and second streams using different software applications within the client device, the first and second applications providing the synchronization.

In another embodiment, the method comprises: allocating the media to a first transport stream different than, but substantially synchronized with, a second transport stream to which the caption data is allocated; and processing the first and second streams to display the media content and the caption data simultaneously on the same display, the synchronization being provided by selectively delaying at least one of the first and second streams.

DETAILED DESCRIPTION OF THE INVENTION

Figure 1:
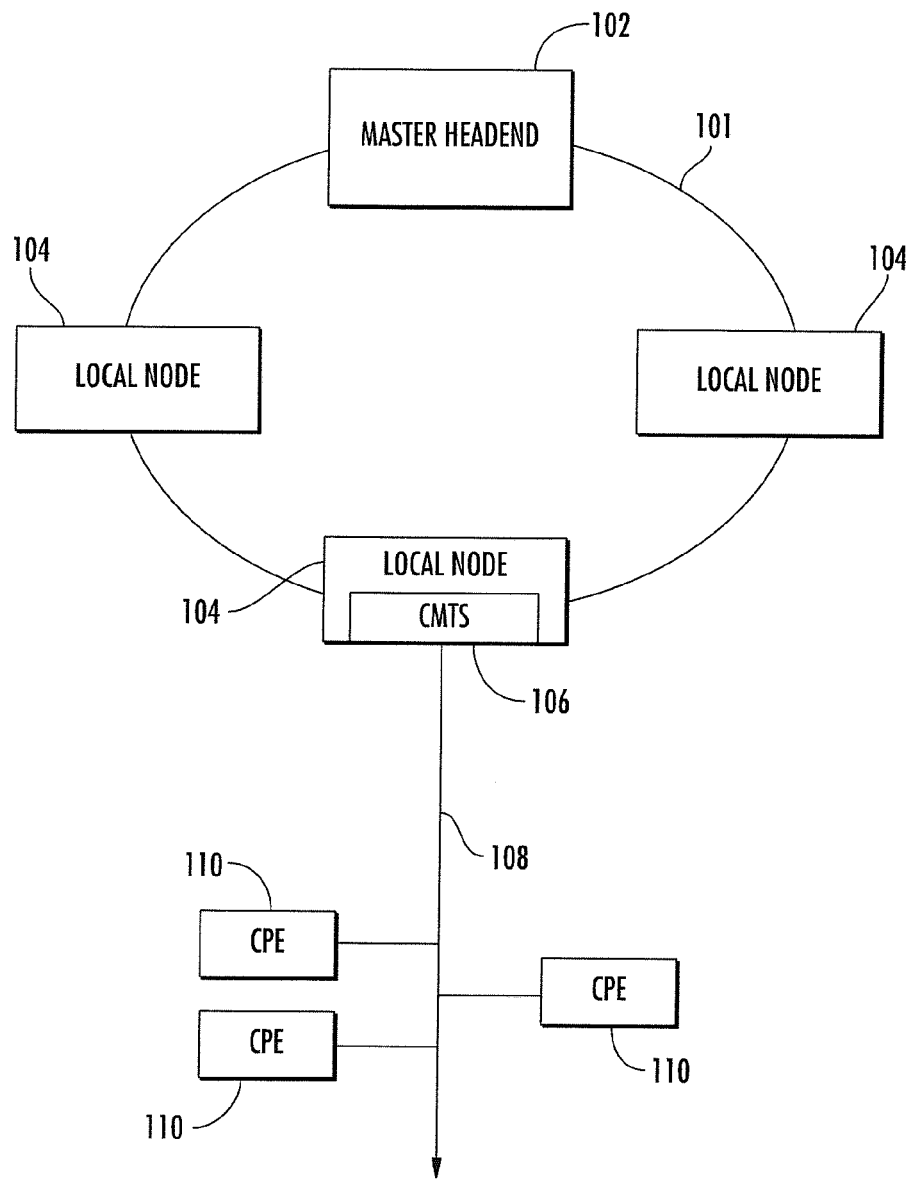
FIG. 1 is a functional block diagram illustrating an exemplary content-based (e.g., cable) network configuration useful with the present invention.

Reference is now made to the drawings wherein like numerals refer to like parts throughout.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, intemets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "head-end" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the terms "client device" and "end user device" include, but are not limited to, personal computers (PCs) and minicomputers, whether desktop, laptop, or otherwise, set-top boxes such as the Motorola DCT2XXX/5XXX and Scientific Atlanta Explorer 2XXX/3XXX/4XXX/6XXX/ 8XXX series digital devices, personal digital assistants (PDAs) such as the "Palm®" family of devices, handheld computers, personal communicators such as the Motorola Accompli or V710, J2ME equipped devices, cellular telephones, wireless nodes, or literally any other device capable of interchanging data with a network.

Similarly, the terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes, televisions, Digital Video Recorders (DVR), gateway storage devices (Furnace), and ITV Personal Computers.

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "computer program" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "component" in the context of software refers generally to a unit or portion of executable software that is based on a related set of functionalities. For example, a component could be a single class in Java™ or C++. Similarly, the term "module" refers generally to a loosely coupled yet functionally related set of components.

As used herein, the term "server" refers to any computerized component, system or entity regardless of form which is adapted to provide data, files, applications, content, or other services to one or more other devices or entities on a computer network.

As used herein, the terms "closed captioning" "caption data" or "CC data" are used to refer to, without limitation, the transcription of audio programs, as well as extended data services and VBI data/test signals, and delivering information such as metadata associated with a television program (including inter alia providing URLs for selective advertising, Really Simple Syndication (RSS) feed information related to video programs, news clips, stock, weather data, etc.

As used herein, the term "DOCSIS" refers to any of the existing or planned variants of the Data Over Cable Services Interface Specification, including for example DOCSIS versions 1.0, 1.1 and 2.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

Overview

In one aspect of the invention, methods and apparatus for receiving, transmitting and displaying closed captioning (CC) data or text in a network environment are disclosed. In an exemplary embodiment, the network environment comprises an Internet Protocol Television (IPTV) System, and/or system for television broadcast over a broadband connection. The close captioning fields from an incoming video feed are extracted at the time of encoding, and the data from these fields is passed to a close caption server (or similar process) for formatting. In one variant, once the data has been received by the close caption server, it is sent directly to the client(s) of the network with one or more video player(s). In another variant, the CC data is sent to an encoding server for insertion in an encoded video stream. In yet another embodiment, a database is accessed to ensure that only subscribers authorized to receive data associated with one or more specific service classes are sent that data.

At the receiving end (e.g., PC of the subscriber's premises), a video player application running on the client device can access links or pointers (e.g., URLs in an IP network) associated with the guide entry for a given program to determine what type of data services are available with that program. For example, closed captioning data for multiple languages can be sent with an audio/video stream. Once the viewer chooses a viewing option (e.g., which language of CC data to display, where to display it, etc.), the close captioning data is overlaid on the video content and/or displayed in a separate text window per the viewer's settings.

In another salient aspect of the invention, a system is described that provides multi-channel broadcast television programming to client devices connected to program servers located at a node (e.g., cable network head-end) and connected to the client devices via a packet-switched (e.g., IP) network. An exemplary client device comprises a personal computer (PC) with Ethernet connection to its broadband modem and having a web browser, and one or more audio/video decoder programs such as Windows Media player, Real Player, QuickTime player etc.

In one variant, client connectivity is offered via an Instant Messenger (IM) client program such as AOL Instant Messenger (AIM), Yahoo Instant Messenger, or MSN messenger. The connectivity is established by the IM client with a server at the head-end. This approach finds particular utility when the CC server is physically different from the multimedia server that streams audio/video content.

The invention overcomes the deficiencies in the prior art relating to the lack of CC decoding and display capability in the aforementioned decoder programs. The ubiquitous availability of IM client software further leverages deployment of the CC service with no need for additional program installation on the part of an IPTV or other network subscriber.

DETAILED DESCRIPTION OF EXEMPLARY EMBODIMENTS

Exemplary embodiments of the apparatus and methods of the present invention are now described in detail. While these exemplary embodiments are described in the context of the previously mentioned DOCSIS hybrid fiber coax (HFC) cable architecture, the general principles and advantages of the invention may be extended to other types of networks and architectures where delivery of captioned information or data is required or desirable. Such other networks or architectures may be broadband, narrowband, wired or wireless, content or data, or otherwise. Hence, the following description is merely exemplary in nature. For example, the invention may be practiced over a fiber-to-the-home (FTTH) or fiber-to-the-curb (FTTC) system or over future satellite or millimeter wave-based network having two-way capabilities similar to today's digital cable HFC networks.

It will also be appreciated that while described generally in the context of a network providing service to a customer or consumer (i.e., residential) end user domain, the present invention may be readily adapted to other types of environments including, e.g., commercial/enterprise, and government/military applications. Myriad other applications are possible.

Network-Side Architecture

Referring now to FIG. 1, an exemplary data-over-cable (DOCSIS) network 100, including broadcast IPTV service, is shown. For clarity of illustration, some details of the network not pertinent to the present invention have been omitted from FIG. 1. A "master" head-end 102 is connected with one or more local nodes 104 via a network 100. The network 100 could for example comprise an optical fiber network of the type known in the art using dense wave-division multiplexing (DWDM), Synchronous Optical Network (SONET) transport technology or gigabit Ethernet transport. In the downstream direction (from the head-end servers or nodes to the CPE 110), this network performs the function of carrying digital and analog television signals as well as packetized data (e.g., IP) traffic. A cable modem termination system (CMTS) 106 located at a local node 104 provides connectivity to the CPE 110 via the coaxial drop 108. The CMTS interfaces 106 in turn are connected directly or indirectly to the Internet or IP backbone, thereby providing access for the CPE 110 to the Internet (or other internets, intranets, or networks) via the cable network infrastructure. Aggregation of television programs that include local and regional programming, or other types of content, occurs at the head-end 102, where these programs are converted into a suitable transport format and a "channel line-up" is created for delivery to the downstream CPE 110.

Figure 1A:
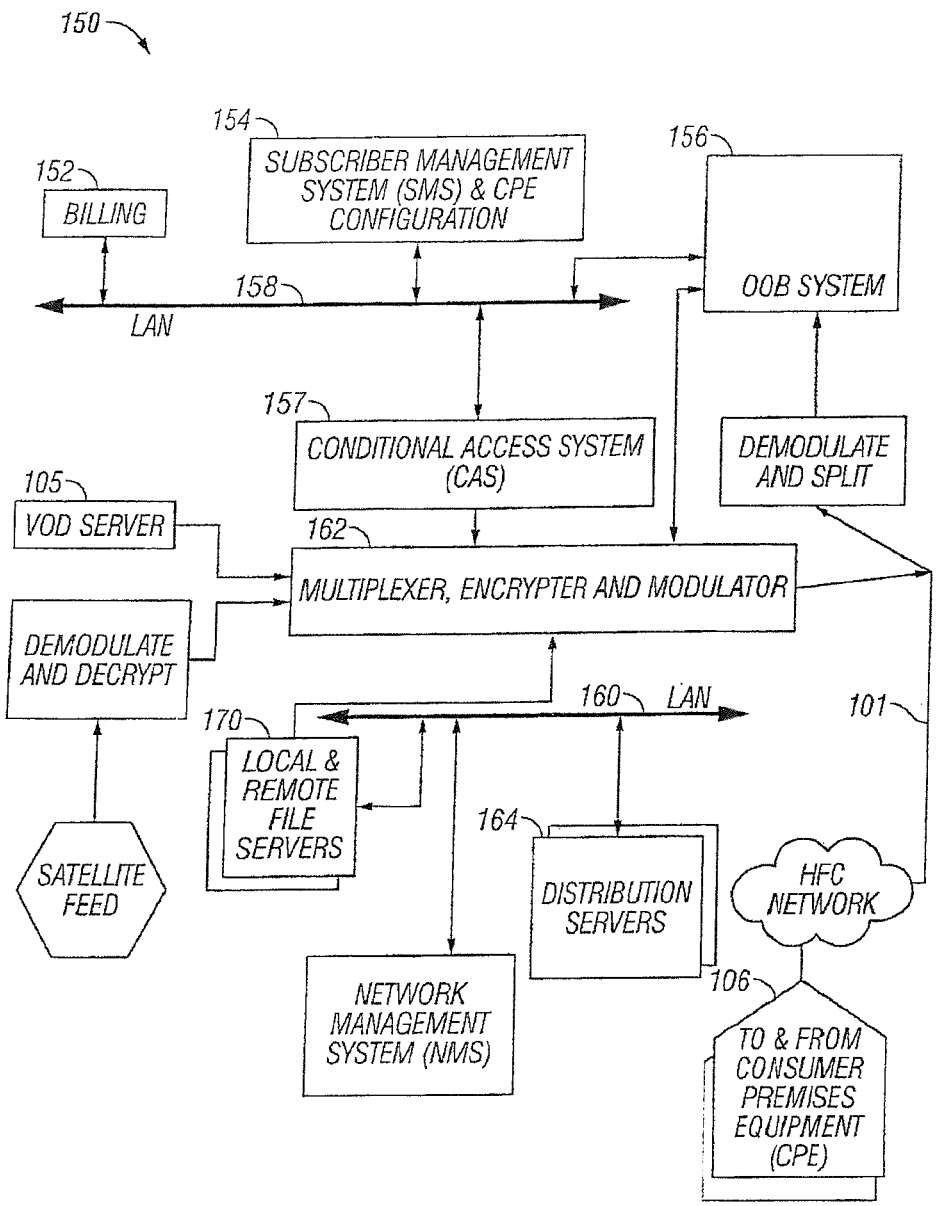
FIG. 1a is a functional block diagram illustrating one exemplary HFC cable network head-end configuration useful with the present invention.

Referring now to FIG. 1a, one exemplary embodiment of a head-end architecture useful with the present invention is described. As shown in FIG. 1a, the head-end architecture 150 comprises typical head-end components and services including billing module 152, subscriber management system (SMS) and CPE configuration management module 154, and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. The head-end architecture 150 may also include a cable-modem termination system (CMTS) if desired.

It will also be appreciated that the head-end configuration depicted in FIG. 1a is high-level, conceptual architecture and that each MSO may have multiple head-ends deployed using custom architectures.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the head-end must be adapted to acquire the information for the carried channels from various sources. Typically, the channels being delivered from the head-end 150 to the CPE 106 ("downstream") are multiplexed together in the head-end and sent to neighborhood hubs (FIG. 1b) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS channels and associated protocols. The OCAP 1.0 (and subsequent) specification provides for exemplary networking protocols both downstream and upstream, although the invention is in no way limited to these exemplary approaches.

Figure 2:
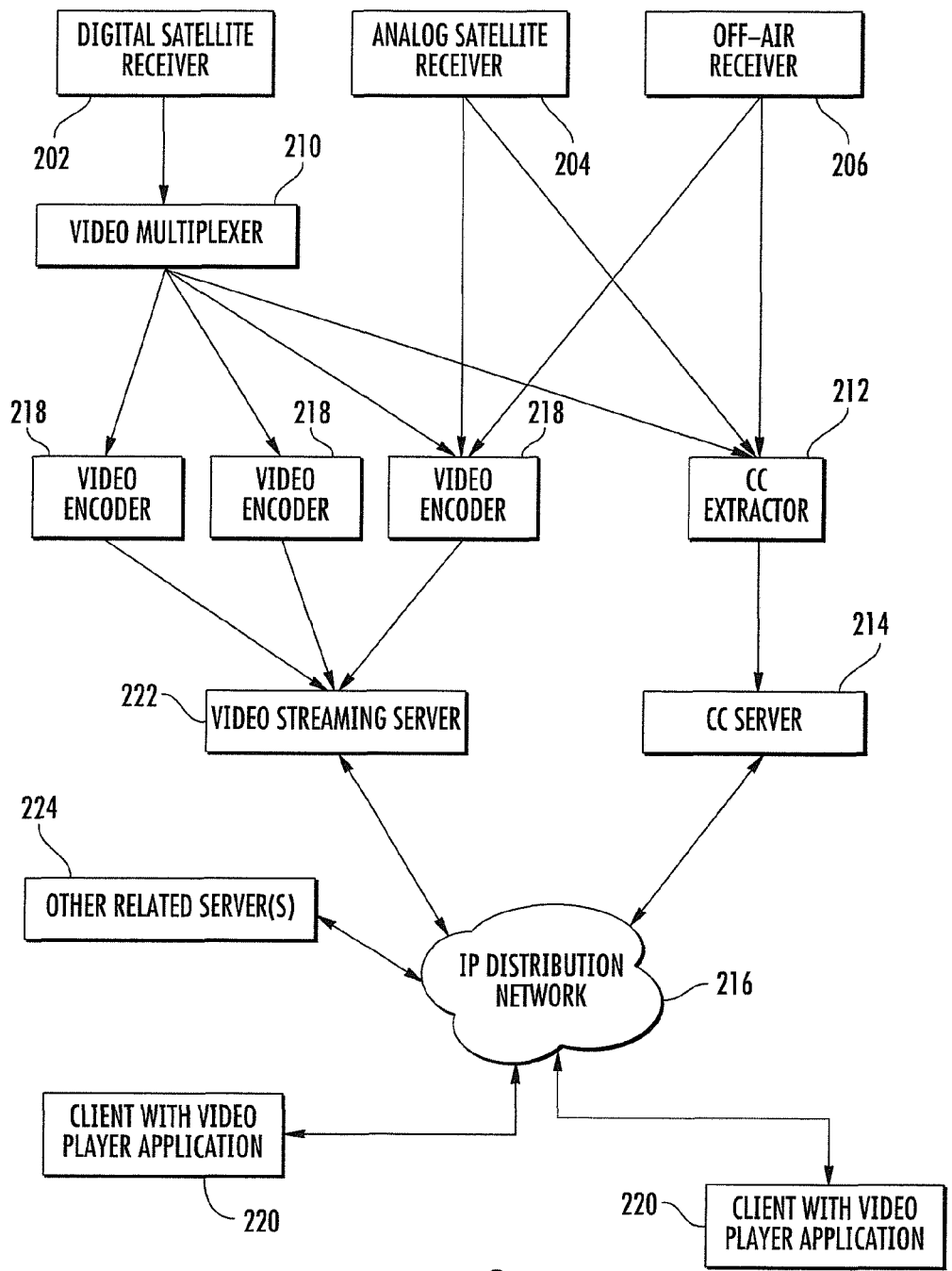
FIG. 2 is a functional block diagram illustrating one exemplary packet-switched distribution network that useful with the present invention.

Referring now to FIG. 2, an exemplary configuration of a packet-switched network useful with the present invention is illustrated. While described in the context of an Internet Protocol Television (IPTV) network, it will be recognized that the principles of the invention can be extended to other transport modalities and network paradigms.

The network 200 of FIG. 2 effectively operates logically "along side" the in-band content delivery system described with respect to FIG. 1a, and shares many common elements. It includes digital satellite receivers 202, analog satellite receivers 204 and off-air receivers 206 deployed within the cable network in order to receive content such as broadcast television programs. This content is then distributed over the cable network. With respect to the IPTV network, the digital satellite feed received via the receiver 202 is sent to a video multiplexer 210 that provides one or more digital programs to one or more video encoders 218 to transcode/transrate or otherwise process incoming digital video streams to a format suitable for loading onto the video streaming server 222. Similarly, the output of the video multiplexer 210 is also provided to a closed captioning (CC) extraction apparatus 212 that extracts CC data embedded in the stream, processes it, and makes it available to a CC server 214 that functions to send out the data to the IP network. The analog satellite receiver 204 and off-air receiver 206 also feed their content signals to the CC extractor 212 which again performs CC extraction, and to a video encoder 218 that converts the analog video into a format suitable for transmission over the IP network (for example, in RealVideo format for Real™ decoders).

The video streaming server 222 and the CC server 214 are in turn connected to the IP Distribution Network 216 (which in the context of a cable network, may comprise, inter alia, the coaxial "drop" 108 of FIG. 1 between the CPE 110 and CMTS 106). Other architectural elements connected to the IP distribution network 216 are shown as "other related servers" 224 in FIG. 2. Client devices 220 (such as PCs connected to cable modems) are connected to the IP distribution network and perform the functions of, inter alia, decoding and displaying video and caption signals.

It will be appreciated that several different embodiments of the above-described IPTV network are possible consistent with the present invention. For example, the video encoders 218 shown in FIG. 2 could be configured to produce one or more bit streams for the same content. Such bit streams could have different bit rates as a function of suitability for transmission over the IP network (e.g., low, medium and high bitrate streams for dial-up, DSL and cable modem IP networks), and/or different encoding formats conforming to audio/video encoding standards such as Real or MPEG or Windows Media Player (WMP). Similarly, the CC extractor 212 could be configured to produce multiple copies of the same incoming vertical blanking (VBI) data each having different encoding formats suitable for different client applications. Each functional block shown in FIG. 2 is described in greater detail subsequently herein.

CC Server Device

Figure 2A:
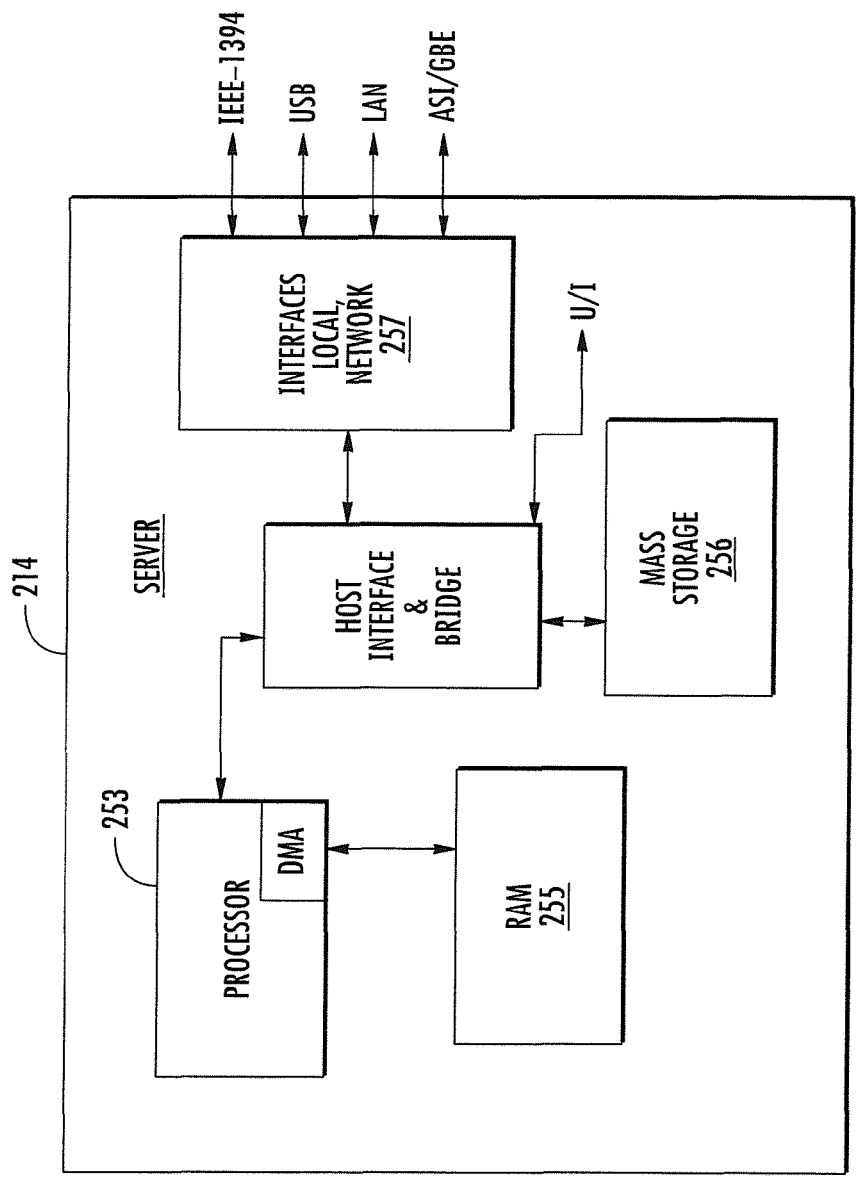
FIG. 2a is a functional block diagram illustrating an exemplary network CC server device (including CC extractor) according to the invention.

Referring now to FIG. 2a, one embodiment of the improved network CC server device 214 with CC extractor 212 according to the present invention is described. As shown in FIG. 2a, the exemplary server device 214 generally comprises an IP-based server module including a digital processor(s) 253, RAM 255, mass storage device 256, and a plurality of interfaces 257 for connection with other network apparatus such as LANs, the local service node hardware, IP routers and other packet network devices, network management and provisioning systems, local PCs, etc. Other components which may be utilized within the server device 214 (depending on where it is employed and how it is physically implemented) include encoders/decoders, encryption/decryption and/or error correction algorithms, board level electronic components, as well as media processors and other specialized SoC or ASIC devices. Support for various processing layers and protocols (e.g., 802.3, SNMP, UDP, SNMP, H.323/RTP/RTCP, VoIP, SIP, etc.) may also be provided as required. The server 214 may also include a metadata "packager", such as for packaging extracted CC data in an XML or other comparable format within a metadata file as discussed subsequently herein.

The server device 214 of FIG. 2a may take any number of physical forms, comprising for example one of a plurality of discrete modules or cards within a hub or head-end component of the type well known in the art. The server may also comprise firmware, either alone or in combination with other hardware/software components such as those previously described. Alternatively, the server module 214 may be a stand-alone device disposed at the hub, head-end, or other location. The server device 214 may also be integrated with other types of components (such as video transceivers, encoders/decoders, etc.) and form factors if desired.

It will be appreciated that while described in the context of separate server disposed at the head-end 150 or a hub of the network as shown in FIG. 2, the device may be adapted for use at other locations within the network. Furthermore, the CC server 214 and CC extraction 212 functions may comprise a distributed software and/or hardware architecture, such as where the extractor 212 and server 214 comprise two or more portions of a distributed application (DA) in communication with one another yet running on different physical devices or network agents. Many such permutations and alternate configurations will be recognized by those of ordinary skill given the present disclosure.

Server/Client Interaction

In conventional broadcast television systems, closed captioning is typically viewed "on demand". That is, while the information may be broadcast with a television program, users typically choose to turn on or off display of such information while watching a given program. Many variations on this theme are known in the prior art. For example, in one such variation, the muting control of a television monitor is used to automatically turn on/off on-screen display of closed captioning (see U.S. Pat. No. 5,327,176 assigned to Forler et al. and issued Jul. 5, 1994).

While the present invention can be implemented in the context of the one-way or "broadcast" model as described above by associating one or more closed captioning streams with the IP traffic of an IPTV television program, it also makes advantageous use of the availability of two-way communication in an IPTV network. Interaction between client devices (e.g., PCs) and captioning servers in such a network can be further used for various ancillary or related functions including, inter alia, optimizing use of network bandwidth, enforcement of service classes (by verifying whether a user is entitled to watch certain caption streams), providing the appropriate caption stream to a client device (the right bitrate and format), and so forth.

Two primary types of client-server interactions are considered in the context of the present invention. The first type of interaction may be performed pursuant to verifying the authenticity (i.e., authentication or identification) of a client device or its user. While some closed captioning data transmissions are mandated by Federal Government regulations in the United States, other type of VBI data may be present in a live television broadcast that a service provider may only make available to subscribers of a particular service tier or group. For example, closed caption data carrying audio transcription may be available to all client devices, but teletext information carrying stock market reports, weather data or other types of information associated with a program may be only made available to subscribers of an "interactive television services" or ITV tier.

The second type of client-server interaction includes the steps implemented by a client device to (i) determine whether closed captioning information is available with a television program, (ii) try to receive (IP or other) packets for the data, and (iii) contact a server or other entity on the network in case the client cannot locate the appropriate packets in the IP stream being received. Such communications may ultimately result in the server re-directing the client to a second packet flow, or the server instructing another server (or itself) to begin a packet flow directed toward the client.

Client-Side Architecture

Figure 2B:
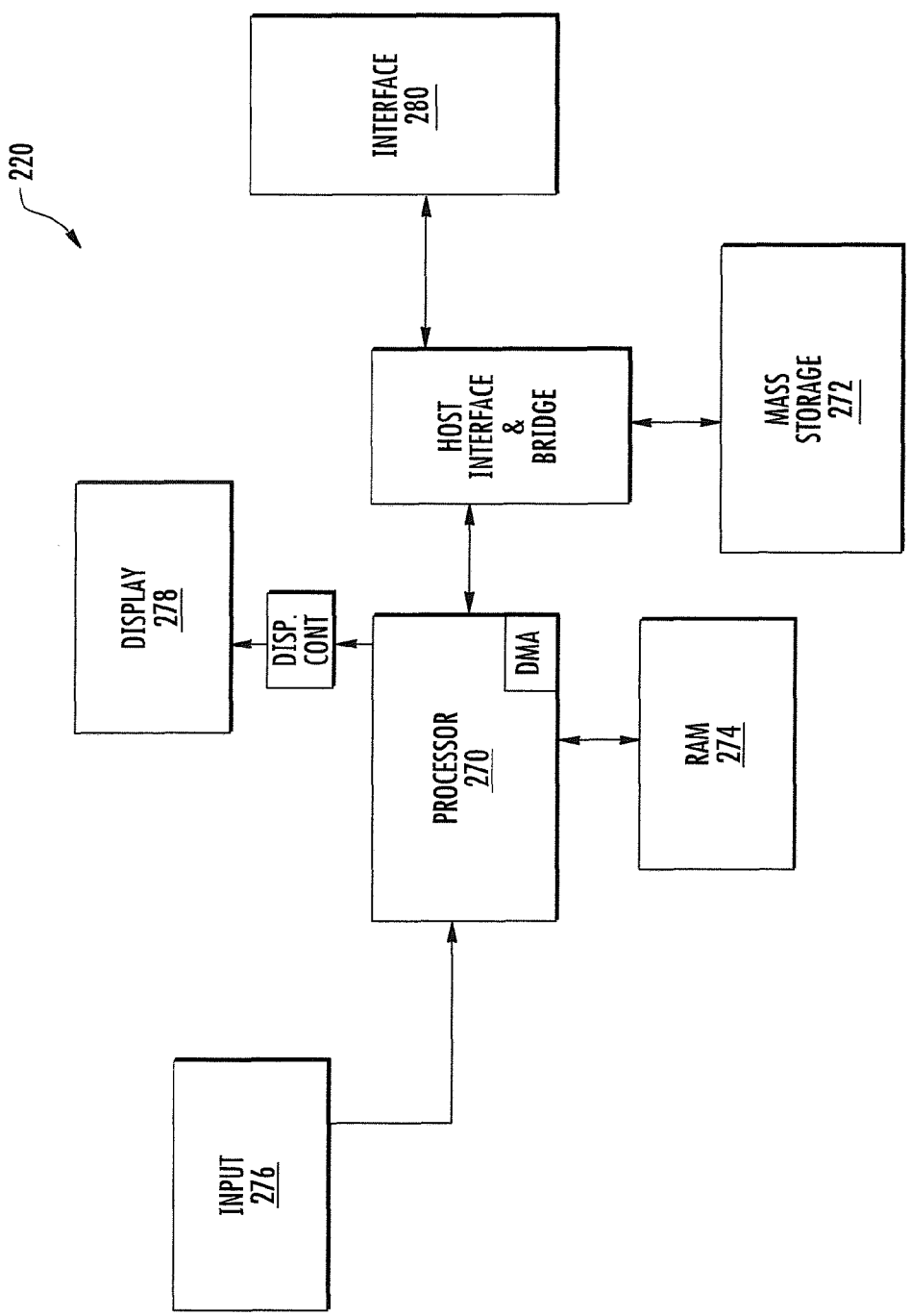
FIG. 2b is a functional block diagram illustrating an exemplary client device adapted for CC data receipt, decode and display, according to the invention.

Referring now to FIG. 2b, one exemplary embodiment of the client device 220 of FIG. 2 is described in detail. A client device 220 in the context of the present invention generally comprises a personal computer (PC) or similar computerized device running, e.g., a Linux™ or Windows® operating system. As is well known, the client device 220 includes a computer processor 270, mass storage 272, RAM 274, input device 276, display device 278, and communications interfaces 280 including for example an RJ-45 LAN connector with Ethernet LAN card, USB ports, IEEE-1394 "Firewire" interface, wireless interface (such as 802.11 LAN card, WiMAX 802.16 interface, 802.15 PAN interface, or Bluetooth interface), and so forth. Computerized systems (whether stationary or mobile) are well known to those of ordinary skill and accordingly not described further herein.

The client device 220 (which may also be integrated, or in communication with, the CPE 110 of FIG. 1) may also include an external or internal modem to achieve connectivity to the network. For example, it is customary to connect the Ethernet port of a PC to an Ethernet output of a cable modem (CM) that itself is connected to a coaxial cable (e.g., DOCSIS) data network. The PC in this case is logically connected to the network side servers via an IP logical (and physical) channel established though the cable modem. In many existing personal computers connected to IP networks, an audio/video decoder (such as the ubiquitous Windows Media Player, Apple QuickTime™ or Real Video) is readily available on the client device, or easily downloaded thereto. However, such decoders lack support to display closed captioning data obtained from an IP stream different than the video stream.

Another application ubiquitously available on such client platforms is an "Instant Messenger" program such as the America Online (AOL) Instant Messenger (AIM) or Yahoo! Messenger or MSN Messenger. The construction and operation of these applications are well known to those of ordinary skill, and accordingly not described further herein.

In an exemplary embodiment of the present invention, a dedicated client application is implemented to receive/decode/display both audio/video portion of a television program and the caption data associated with the program. In another exemplary embodiment, the client-side implementation makes use of existing decoder software (e.g., Real decoder) and an IM client program to display video and closed caption data respectively. In yet another variation, the previous embodiment is further extended by using the IM client software and a corresponding IM server to authenticate a user and his service level.

Sourcing Caption Data and Extraction

Contributions to the available broadcast television programming in a network are made from a variety of sources. As previously discussed with respect to FIG. 2, digital satellite receivers 202 are used to receive program feeds from satellites (e.g., the Time Warner Athena satellite feed or the Motorola Headend-in-the-sky (HITS) satellite feed). Some programs may also be received at the head-end or other node using analog satellite reception 204. Local programming is typically received using some type of off-air reception 206 (antenna or local fiber optic feeds).

Caption extraction is the process by which closed captioning data is extracted from video signals (whether analog or digital), parsed and packed into a digital format suitable for storage and transmission over the (e.g., IP) network.

The tasks of CC data extraction performed by the CC extractor 214 are somewhat different based on whether the source program is available in encoded digital format (typically MPEG transport) or analog format. When the source programming (and hence the VBI data) is available in digital transport stream format, the CC extractor receives and extracts the closed captioning data from the stream, either from a separate MPEG program ID (PID) or from a user data portion of video or other scheme. The CC extractor then re-packages the data in a format suitable for the CC server. In one embodiment of the present invention, the CC extractor also extracts or calculates a time reference or value associated with the closed captioning data in order to permit a time reference for synchronization with the associated video content. For example, such time value may be referenced to SI time which is already present within the network and used for such purposes, although other timing references (including even an internally-generated clock or timing reference) may be used as well.

The closed captioning data extracted from the incoming digital streams may also be held in a temporary buffer to match delays for further transportation in the IPTV system as described in greater detail subsequently herein, or to perform different mechanisms of aggregation on the caption data. For example, incoming caption data might be delivered at a rate or two (2) bytes per video frame; the CC extractor 214 may be configured to package the caption data from multiple video frames into a single IP packet so as to pack the IP packet payload more efficiently.

When the incoming video is in analog format (such as for analog satellite receivers), the CC extractor 214 decodes the analog CC lines and extracts caption and other signals into a digital format. Further processing of the recovered caption data bits is performed in a manner substantially similar to the caption data from video transport streams.

Apparatus and methods for extraction of CC data from analog television signals are known and readily available; for example, Miranda Corporation's Allegro-1 Video/streaming Encoder Server product provides the ability to extract closed captioning/NVBI data from an incoming analog television signal or serial digital (uncompressed) television signal. This product further sends the extracted closed captioning to an IP network as IP packet traffic. However, the present invention extends these capabilities by providing, inter alia, (i) support of multiple video formats, (ii) client-server interaction for authentication/identification, and (iii) "out-of-band" delivery of caption data.

Transport of Caption Data

Various approaches for sending the caption data generated in the above described sourcing and extraction steps over the IP network may be used consistent with the present invention. Specifically, when the caption data is transported within packet (e.g., IP) flows that also are used to transport audio and/or video content, the technique is called "in-band" transportation of caption data. An IP flow is generally defined in the conventional art as the stream or aggregation of IP packets with same source and destination addresses and also same "port" or "socket" ID (e.g., TCP or UDP port ID).

Another technique, colloquially referred to as "out-of-band" transport, refers to carriage of caption data in an IP flow different from an audio or a video flow. Note that audio and video content may in turn be transported using in-band or out-of-band techniques. That is, audio and video packetized data could be transported using same or different IP flows, which may or may not coincide with the transport mechanism of the caption data.

In conventional applications, caption data that carries audio transcription is typically sent at the rate of two (2) bytes per video frame. When using IP transport, the caption data can be aggregated to build a single IP packet from data contained within multiple video frames, as previously discussed. A variety of different approaches or schemes for such aggregation are known. For example, the Internet Streaming Media Alliance (ISMA) provides various specifications for streaming closed caption data over IP networks. ISMA Specification 2.0, incorporated herein by reference in its entirety, addresses advanced codec technology for audio and video applications, as well as Internet protocols for streaming and file formats for storage. The related ISMA Closed Caption Specification, incorporated herein by reference in its entirety, addresses mandatory requirements in the U.S. for providing captions where audio is essential to understanding video content. The ISMA Encryption & Authentication Specification 1.0, incorporated herein by reference in its entirety, describes a framework for secure content delivery over Internet Protocol (IP) networks, and also addresses interoperability between encoders, streaming servers, and players complying with open, standards-based technologies.

Within one or more of these standards, various CC data aggregation and protocol options (and tradeoffs) are disclosed. It will be appreciated that literally any such packetization/aggregation technique, whether ISMA-based or otherwise, can be used consistent with the present invention.

In an exemplary embodiment of the invention, the CC data is sent out using out-of-band (OOB) transport mechanism. Due to the OOB nature of data delivery, it is not required to have the same server(s) that are streaming the video/audio content also stream the CC data, thereby adding significant operational flexibility. For example, in a multi-channel digital television network, multiple CC data servers could be located across the connected IP network, each supplying CC data for one or more (or occasionally zero) programs. Similarly, a single OOB caption stream can be configured to support video IP streams containing the same content in different formats (e.g., MPEG or Real). The OOB transport mechanism also lends itself well to the use of separate client applications (e.g., Real decoder for decoding video, and AOL Instant Messenger for decoding CC data).

It will be recognized that the present invention provides a further benefit in terms of permitting optimization of network bandwidth allocation by providing broadcast/multicast transmission capability, and eliminating the need to send CC data packets over the IP network when no client device has requested it. Specifically, with each CC stream occupying approximately 10 Kbps of bandwidth, the total network bandwidth used for all CC data belonging to all available channels and all available video formats could readily exceed several hundred Kbps. Hence, by allowing the selective provision of one or more of these CC streams, the invention gives the network operator the ability to accurately tailor their CC delivery profile to the needs of the subscribers, thereby maximizing opportunities for conserving bandwidth in this manner. Such selective "switching" of CC streams on and off can be accomplished almost instantaneously, thereby avoiding any subscriber perception of latency while also providing a high degree of responsiveness in terms of bandwidth reduction.

In one simple deployment scenario, CC data can be unicast to each client asking for it (e.g., based on their IP address, etc.). When many viewers desire to receive CC data associated with a television program, multicasting (including potentially broadcasting) may be employed to more efficiently utilize network bandwidth.

The CC streaming server is also advantageously provided feedback from the IM server, directly from the client device 220, or from another source regarding channel changes, or the user turning off the CC display option, the client device powering down, and so forth, thereby allowing for the CC data transport mechanism to have minimum latency.

It will be appreciated that in certain environments (e.g., TCP protocol), the ability to multicast CC data may be limited or even non-existent. In such cases, delivery of CC data to multiple clients may be accomplished by merely uni-casting the CC data to the multiple clients. Alternatively, another environment or protocol which has multicast capability can be employed. Myriad different methods for accomplishing multicasting over a network will be recognized by those of ordinary skill.

Program Guide Entry for Caption Data

Figure 3:
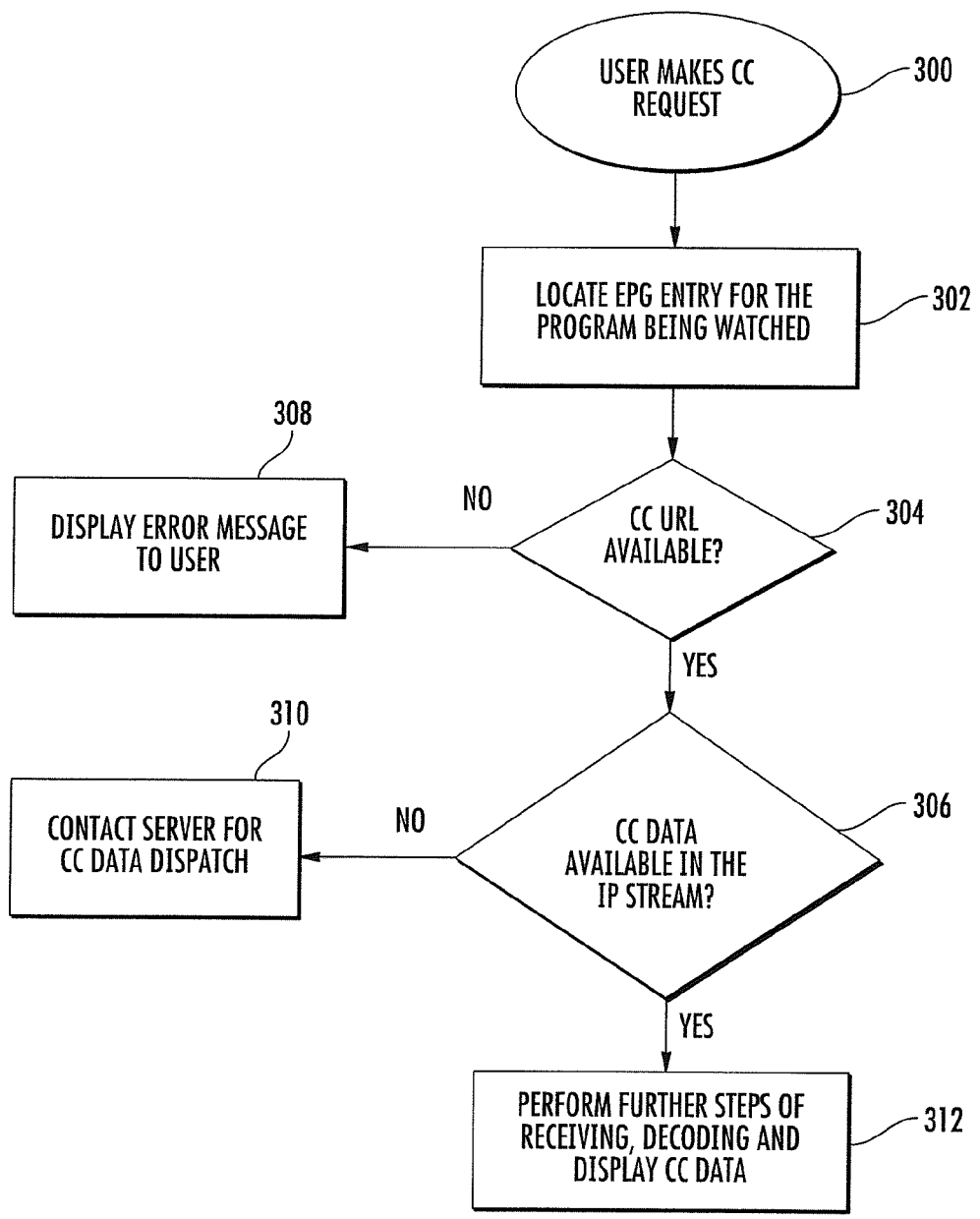
FIG. 3 is a logical flowchart illustrating one embodiment of the method of CC data processing within the client device according to the invention.

To be able to view caption data associated with a broadcast or other television program, the client device 220 has to be able to (1) check if caption data is available with the program or content, (2) identify the type of caption data available, and (3) identify the mechanism it needs to use to begin receiving the caption data. Referring to FIG. 3, one exemplary embodiment of the methodology performed within the client device 220 of the invention to implement this functionality is now described.

As shown in FIG. 3, when a user desires to display caption data (step 300), the client device 220 (i.e., the client software application) locates the electronic program guide (EPG) entry for the program being watched per step 302. If a URL (or other comparable link or pointer) is not available for the type of CC data desired (step 304), an error message is generated (step 308). If the URL is available, the client application uses information from the program guide entry to ascertain if the CC data is available in the IP stream being sent to it (step 306). If the client is not able to locate the CC data in the stream, it then proceeds to contact the server indicated by the URL (step 310) so that CC data can be sent to the client. If the client is able to locate IP packets containing the CC data desired, it then proceeds to receive, decode and display the caption data (step 312).

In an exemplary embodiment of the invention, URLs are used to perform the foregoing functions. The URL address of the caption server 214 associated with a client device 220 is conveyed to the client application a priori. Based on the program guide entry for a given television program, the client device 220 can check types of caption and other metadata available with the program. Associated with each entry of caption data is a URL or description of the flow of IP packets (e.g., UDP port ID and source IP address) where the caption data is available on the network. A metadata file, as described in greater detail below, may also be associated with the content.

In one variant of the invention, the caption data is located indirectly by first contacting the entity (e.g., server) whose URL is provided in the program guide, and then obtaining the URL information for the caption data itself. Other variations of this approach will also be recognized by those of ordinary skill. Such indirect access provides the network operator flexibility to dynamically manage network bandwidth utilization based on run-time conditions existing when the CC data is required.

In another variant, the CC data is contained in the form of a metadata file which is accessible to the client process (or its proxy). Generally speaking, "metadata" comprises extra data not typically found in typical primary content (or at least not visible to the users of the network). This approach obviates much of the "extraction" process previously described, since the network operator can specify a metadata content format that effectively "pre-extracts" and formats the CC data for ready access and display by the client application(s). This metadata can be provided with the content from its source or provider (e.g., a network studio or station or the like), or alternatively added or generated by the site operator. Alternatively, portions of the metadata can be added by multiple entities, and/or editing of another entity's metadata performed. Various permutations and mechanisms for generating, adding and editing metadata will be recognized by those of ordinary skill, and hence are not described in greater detail herein.

The metadata file can be disposed on a remote server, such that it is accessed and transmitted by the CC server 214 in similar fashion to that previously described herein. Alternatively, the metadata file can be accessed and downloaded (whether via the IP network or other transport channel) by the client device 220, and then "played" by the relevant client application in concert with the primary (audio/video) content. For example, the CC metadata file can be downloaded at the initiation of a client session or switching request (as opposed to being streamed in a substantially contemporaneous fashion as previously described).

The metadata file may contain timing or synchronization marks to permit synchronization if desired. The client video/audio application and or CC data application (if separate) may also each buffer their respective data at the client device 220 in order to effectuate this synchronization between the two environments.

By utilizing a pre-formatted metadata file for the CC data, the CC data can be pre-positioned at the desired point in the network for subsequent use, so as to obviate issues associated with real-time extraction and streaming/download to the client device.

Use of Instant Messaging Protocol

Figure 4:
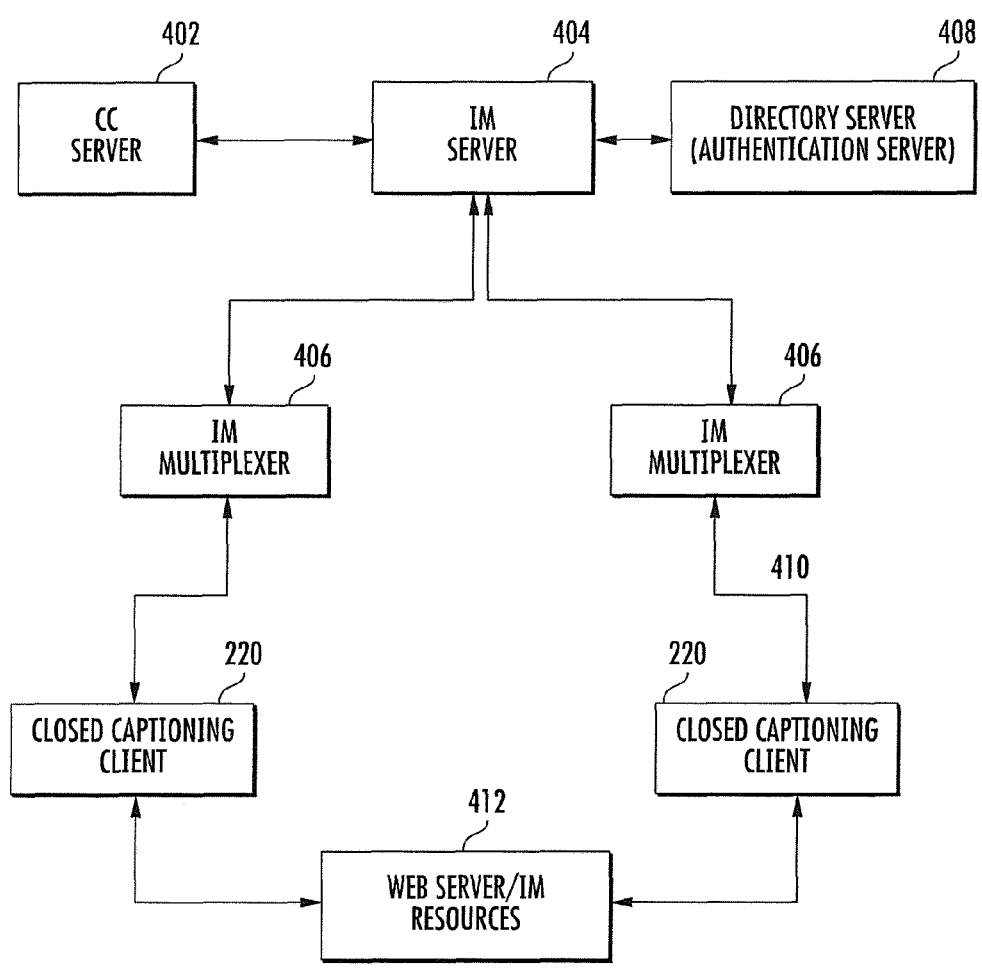
FIG. 4 is a functional block representation of an exemplary IPTV network wherein CC data distribution utilizes an instant messaging infrastructure.

In one exemplary embodiment of the invention, caption data is provided to the client devices 220 by using instant messaging (IM) technology and using IM servers available in the IP network to provide messaging connectivity and transportation. An exemplary configuration is shown in FIG. 4. Referring to FIG. 4, the closed captioning clients (e.g., PCs) 220 are logically connected via an IP connection to the CC server 214. Specifically, a connection is provided between the CC server 214 and an IM server 404. In turn, the IM server 404 is connected to a Directory Server 408, that also optionally functions as an authentication/identification server. An IP connection is established between the IM server 404 and the IM client application running on the client devices 220 via the IM multiplexers 406 that multiplex/demultiplex data to/from multiple IM clients and the IM server. The client devices 220 are also optionally connected to a web server 412 that makes IM resources available to the IM software running on the client devices.

Service Authentication

Figure 5:
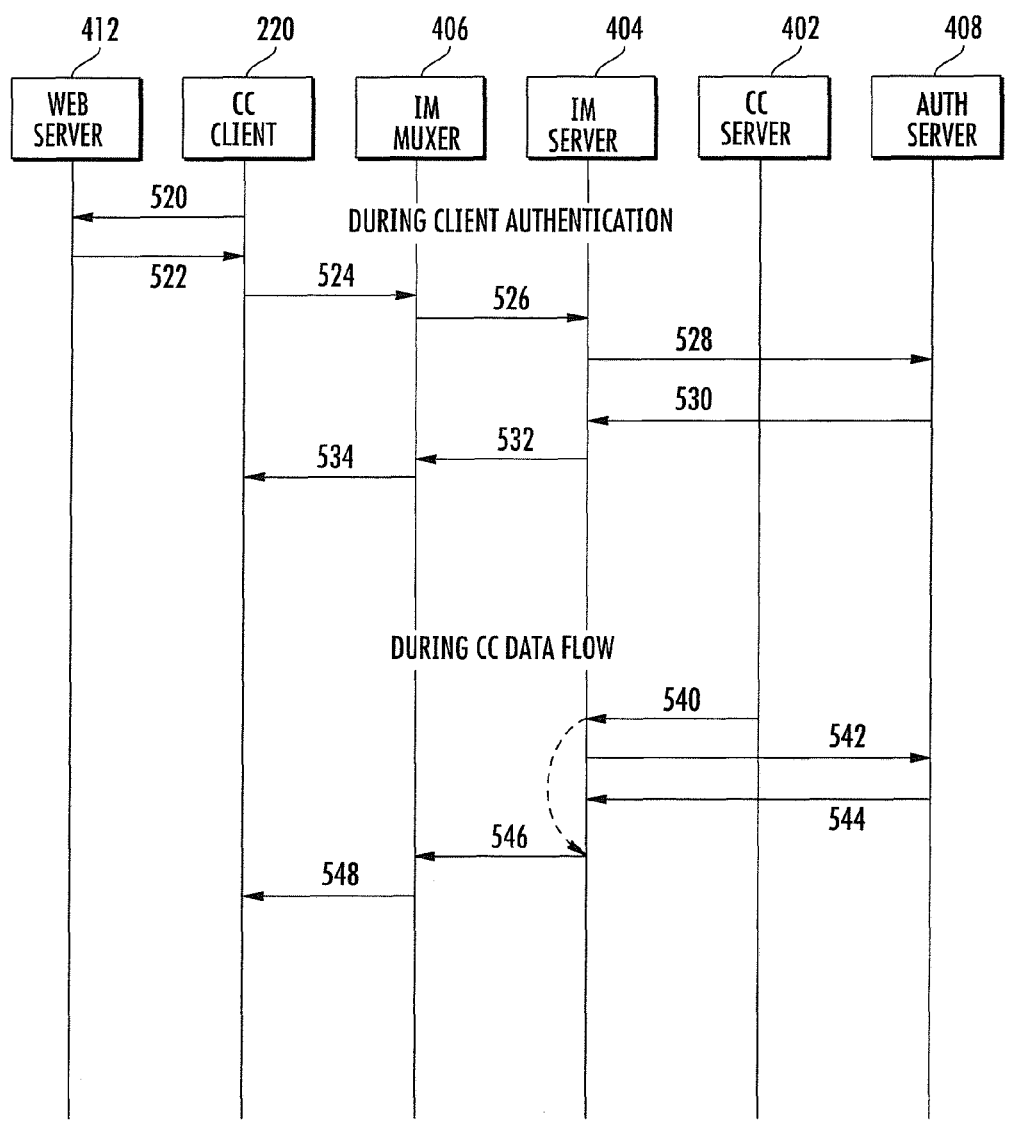
FIG. 5 is graphic representation of an exemplary message exchange protocol showing messages exchanged between various elements of the CC data processing and delivery system.

Referring to the signal exchange diagram of FIG. 5, key functional elements of the exemplary system utilizing IM infrastructure for delivery of CC data include: a CC client device 220, a web server 412, an IM Multiplexer 406, an IM server 404, a CC server 214, and an authentication/identification server 408. It will be recognized that while illustrated as separate entities for clarity, more than one of the foregoing functions may be implemented on the same hardware platform in certain embodiments of the invention.

FIG. 5 illustrates two sets of signal exchanges that occur during the operation of the exemplary system. During client authentication/identification, the CC client 220 locates the web server 412 from information available to it (e.g., using electronic program guide information), and sends a closed caption viewing request 520. The web server returns address of a IM multiplexer (muxer) 406 in a message 522. The client then proceeds to contact the IM muxer 406 using a message 524 presenting its credentials. The IM muxer forwards this request to the appropriate IM server 404 in another message 526. In one embodiment, the client device 220 may be directly provided the resource locator (URL) of the IM muxer 406 or of the IM server 404, thereby making the aforementioned intermediate steps and messaging unnecessary.

The IM server 404 next performs a message exchange with the authentication server 408. In this message exchange, the IM server presents the authentication server 408 with credentials of the CC client that has requested to watch certain CC data per step 528, and in return the authentication server provides the IM server 404 information about the service(s) the client is authorized to receive (step 530). Once the client device is authenticated (or not authenticated), an appropriate success or reject message is sent by the IM server (step 532) via the IM muxer or another channel to the CC client device 220 (step 534).

While watching a video program, when the viewer desires to receive closed captioning data, the client device 220 contacts the CC server 214. If the device 220 is not previously known or served, the CC server may want to check its credentials and service level by sending a query to the IM server 404 (step 540), which in turn communicates with the authentication server 408 via query (step 542) and response (step 544) mechanisms. Once the device 220 is authenticated, CC data begins to flow from the CC server (step 540) to the IM muxer (step 546) and ultimately to the CC-capable client device (step 548).

Synchronization of Video and CC Data

As previously referenced, in order to achieve synchronization of the CC data and video when presenting to the viewer at their premises, timing information may be embedded within the video IP flows and the CC data IP flows (or metadata files). Where a single dedicated video and CC data display application is utilized, this timing information can be used to readily synchronize the delivery of the video/audio content and that of the CC data, since the time reference of each "environment" is common. However, such an implementation can become cumbersome where two separate or discrete applications are used (i.e., one for video decode/display, and another for CC data decode/display), since each may not have information about time base and decode delays of each other.

Accordingly, in another embodiment of the present invention, a substantially simplified scheme is implemented where no explicit timing information is embedded within the IP flows. As discussed in greater detail subsequently herein with respect to FIG. 6, synchronization is achieved by simply decoding and presenting video and CC data "as they come" to the client device 220. Acceptable synchronization ("lip sync") can be achieved by taking into account the known delay differential between the selected A/V encoding technique and the CC data/metadata encoding. This simplified scheme eliminates the need of complex synchronization circuitry to take into account time stamps and other similar mechanisms, which adds a layer of complexity to the processing required by the client device. Since the delays in a managed network are known a priori, this scheme effectively achieves acceptable synchronized presentation of closed captioning and audio/video data with minimal overhead.

Figure 6:
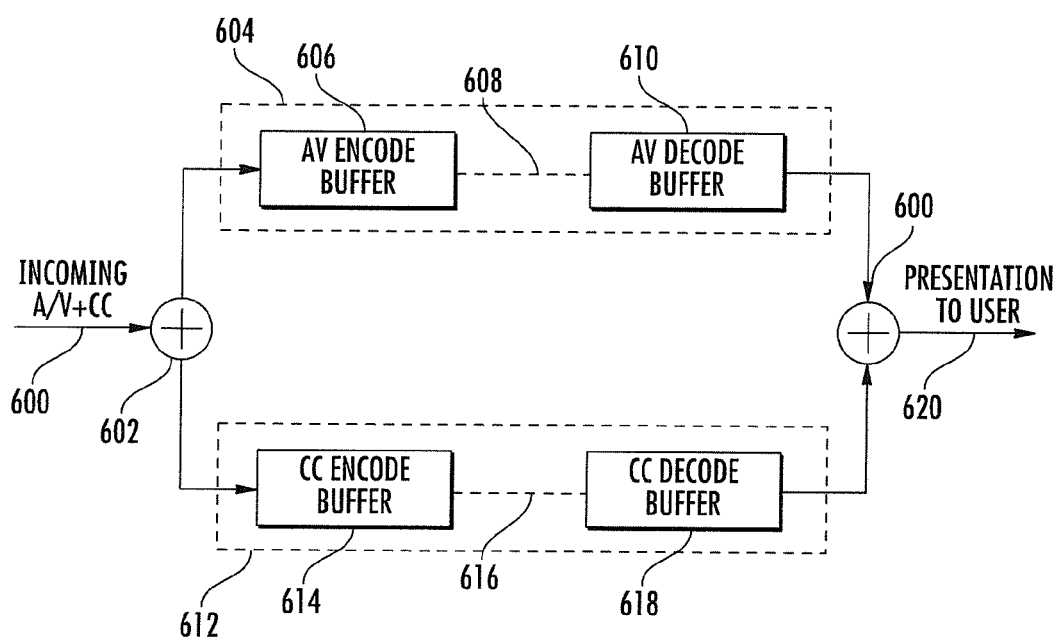
FIG. 6 is a block diagram illustrating delays incurred by audio, video and closed captioning data in an exemplary IPTV distribution network.

FIG. 6 illustrates an exemplary incoming analog or digital television program with CC data embedded within the signal 600. At the CC extraction stage (represented as the splitter 602 in the Figure), the audio/video signals are separated from the CC data. The audio/video data goes through a first path 604 that is shown to have an encoder buffer 606, which introduces encoding delay and a decoder buffer 610 that introduces a decoding delay. The audio/video data travels from the encoder to the decoder over an IP connection 608. In the second or CC data path 612, the CC data incurs a delay through the encoder/extraction side buffer 614 and a decoder buffer 618 in the CC client device. The CC data is sent from the encoder to the decoder via an IP flow 616. For the sake of clarity, FIG. 6 shows audio and video signals going through the same encoder/decoder path. However, in typical embodiments, audio/video signals will each individually go through different encoder/decoder delays. The mechanisms used for synchronization of audio and video data are well known and not addressed further herein.

In general, the IP flows 608 and 616 of FIG. 6 can have different characteristics (e.g., UDP versus TCP traffic, encrypted versus encrypted IP packets, FEC versus non-FEC, etc.). While the difference in delay incurred by such different packet traffic in a network will not be significant for the CC data synchronization, the present invention none-the-less anticipates and accounts for these delays in the decoder buffer delay blocks.

One goal of a simple synchronization scheme is to match the total delay in the audio/video path 604 to the total delay in closed captioning path 612 such that when the signals are combined in a client device (shown as a combiner 600), and presented to the user 620, the original timing relationship of the incoming television signal 600 is substantially preserved. Based on the actual video codec employed, the encoder and decoder delays 606 and 610 may be different.

In one embodiment of the invention, a predetermined buffer value (which may be different for each) is chosen for encoder and decoder delays. In a managed network such as IPTV over DOCSIS network, the delays in the audio/video path 604 are substantially predictable, and can be matched reasonably well with a static buffer value.

In another embodiment, the value of encoder delay employed in the block 614 is made a function of the corresponding video format that the client device 220 receiving the CC data is using. Since the IPTV system offers video/audio in multiple formats, multiple values of delay in the elements 606 and 610 are anticipated and can be selectively employed as part of the present invention. The selection of a codec or format by the client device can be readily transmitted upstream to the server, thereby allowing for an apparently seamless adjustment or transition.

In yet another embodiment, a time stamp or reference can be used; for example, the CC data can be time-stamped using the ingress time of the CC signal. This time stamp or reference can then be used by the client device 220 upon delivery of the CC data thereto in order to synchronize the data with corresponding video/audio signals prior to the presentation to the user.

In still another embodiment, a global time server/source or other "absolute" reference can be used as the basis of synchronization for client and server functions. This approach has the advantage of allowing the client and server (and any other required entities) to synchronize to a common source, thereby eliminating any disparities between separate sources (which may vary as a function of time or other parameters).

It will also be recognized that the foregoing schemes (i.e., inclusion of timing information, and the more simplified a priori delay approach of FIG. 6) can be selectively utilized and switched between, such as based on the level of processing and storage capability of a given client device 220 and its available codecs. For example, "thinner" client devices may, e.g., opt for the latter approach, wherein more capable device would utilize the former, the benefit of the timing information being more accurate synchronization. The client devices capabilities may, for example, be communicated upstream from the client device 220 to the CC server 214 as an input to the selection process.

Furthermore certain types of CC data (e.g., financial ticker, news feeds, or similar data) may not require any synchronization, or rather merely some gross "context" or association, but no specific synchronization, such as where certain tickers run asynchronously yet within prescribed "windows" of context within the primary audio/video content stream. For example, sports score tickers should run during the "sports" portion of a newscast, but not necessarily be synchronized to any given event or audio within that portion.

Personal Video Encoder (PVE) Variants

In another embodiment of the invention, a personal video encoder (PVE) or comparable device is used as the basis for the client device 220. For example, the "Slingbox" device manufactured by Sling Media of San Mateo, Calif. is one such exemplary device which is capable of enabling a user to watch TV programming from various locations via an Internet-connected PC or similar device. The device is generally connected between the subscriber's cable/satellite video drop and DSTB, and has a TV tuner inside. The user tunes to a given channel, and the device encodes the video streamed over the cable/satellite in Windows Media or similar format. The encoded content is streamed to a client application on a Windows XP-based or similar PC via an IP network such as the Internet, and hence the user can view the data locally (i.e., at the same premises) or remotely so long as they have access to the IP distribution network. Such devices, however, do not have the ability to render/extract and deliver the CC data to the appropriate user application. Hence, the present invention advantageously extends the capability of such PVE devices by providing the capability to extract (or download) the CC data and deliver it (e.g., in an OOB-fashion) to the Windows-based or other client application for display and rendering, as well as control functions (e.g., how large the text is when displayed, where it is displayed, language, etc.). In one embodiment, the PVE is outfitted with the necessary CC data receiving and decoding software. In another embodiment, the PVE merely acts as pass-through or router entity, with the CC data receipt, decoding and player functions being disposed entirely on the PC or laptop computer used as the subscriber's "viewing" device at their actual location.

Operations/Business Methods

Recognizing that caption data and other type of metadata could have multiple uses at the application layer of the client device 220, such data can be packaged according to a number of different business models including (without limitation): (i) as an add-on or separate service (e.g., all or none); (ii) as a multi-level or tiered service based on user subscription level; (iii) as a variable feature differentiated across subscribers based on geographic location, client device capability, language capability, or other intrinsic features aside from their subscription level; and/or (iv) as a free ("baseline") or promotional capability. A user wishing to receive such caption data stream may require prior authorization (as previously described) before the caption server streams data to the user from the server URL. For example, the electronic program guide may give an explicit URL in the form of a secure HTTP address where the user can perform transaction to enable caption data or metadata reception capability.

In one variant, these methods effectively bundle or link one or more features not critical to (but ideally useful or desirable with) the CC data delivery in order to provide subscribers enhanced functionality and "user experience." These ancillary services or features can comprise a basis for a multi-tiered or "premium" subscriber class business model, be given as an incentive feature for a subscription, or otherwise.

One exemplary ancillary service that can be bundled with the CC data delivery comprises the ability to pass through CC data or communications to remote entities in data communication with the base (e.g., IP) distribution network. For example, the aforementioned PVE device (e.g., Slingbox or similar) can be distributed under lease (or for free) to subscribers as part of the model. The PVE device allows the subscriber to access network programming via their mobile device (e.g., laptop) from a remote location. It would be highly desirable for many users, especially those who travel frequently, to have assurance of receiving CC information via their mobile or remote devices.

Another such ancillary service could comprise providing topically related or coupled information sources, such as e.g., information or links relating to the topic of the program. Under the prior art, such related information is provided as a separate screen, typically at the end of the program (for example, providing a website URL or telephone number). In contrast, the present invention can provide them as part of the caption data, including at times when the information is most relevant. Specifically, one or more "links" can be provided in the context of the program, such as during a given scene in a video or documentary. This is somewhat akin to context-specific embedded hyperlinks on an HTML web page as is known in the prior art, except in the present instance the delivery medium is CC data or associated metadata in concert with content (e.g., video) delivery. These ancillary sources could directly coupled to the CC data delivery as well, such as where the video stream/feed to which the client application tunes includes this information along with the CC data. For example, in one variant, a multi-pane display comprising, e.g., (i) the CC data, and (ii) the relevant ancillary data could be provided to subscribers. This can also be coupled to the aforementioned PVE capability if desired, thereby providing the user with a mobile source of CC and ancillary data (e.g., via a WiFi or WiMax node, cellular interface, satellite link, or other mobile communications link).

The methods and apparatus of co-pending and co-owned U.S. patent application Ser. No. 11/198,620 filed Aug. 4, 2005 and entitled "METHOD AND APPARATUS FOR CONTEXT-SPECIFIC CONTENT DELIVERY", which is incorporated herein by reference in its entirety may also be utilized in conjunction with the present invention. Specifically, the aforementioned application discloses, inter alia, methods and apparatus for utilizing metadata or similar data structures associated with video content as a basis for providing targeted and seamless linking to a secondary content source (e.g., advertising server links) within a video player window displayed on a PC or similar device. Accordingly, the secondary content sources could be constrained in one embodiment to include those of particular relevance to certain context within the primary content (e.g., video), such context itself being encoded in one variant within metadata. For example, in the case of a video relating to golfing, associated metadata (which can be synchronized with the video stream via, e.g., SI, global, or other time references) for a specific portion of the video dealing with golf swing might have metadata comprising "golf swing", which can then be used as the basis of a search term or entry into a secondary content or ad server. Hence, the user could be presented with a small pop-up window (akin to those in pop-up blocker applications indicating a blocked pop-up) or other display device that queries "Want to know more about golf swings?", and optionally one or more associated links. Alternatively, this information or link(s) can be included within the same overlay or display device used for the CC data, for example being "ghosted" (i.e., displayed at reduced intensity and/or contrast) along with the CC data, or set up as a second "ticker" stream coincident with a CC data ticker stream.

It will also be appreciated that due to substantial similarities, the methods and apparatus for emergency alert or EAS data delivery described in co-owned and co-pending U.S. patent application Ser. No. 11/299,169 filed contemporaneously herewith and entitled "EMERGENCY ALERT DATA DELIVERY APPARATUS AND METHODS", previously incorporated herein, can be readily used in conjunction with the CC data delivery apparatus and methods described herein. For example, a common EAS and CC server entity can be specified at the head-end 150 or another node to permit the EAS and CC functions to be integrated. Furthermore, the CC client application can include EAS functionality (or vice versa), which may also include the ability to support one or more commercial video decoders (such as Real, H.264, WMP, etc.) as well as IM capability.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A system for distribution of multimedia content and associated closed-caption data over a packet-switched network, said system comprising:

a content source adapted to generate said multimedia content comprising associated closed-caption data;

a caption data server;

a streaming server;

a headend apparatus configured to receive said multimedia content from said content source and provide said multimedia content to said caption data server and to said streaming server, said caption data server configured to extract said caption data from said multimedia content and said streaming server configured to format said multimedia content; and at least one client device in data communication with said streaming server and said caption data server, said at least one client device configured to receive said multimedia content directly from said streaming server and said caption data directly from said caption data server, and display said multimedia content and said caption data in a substantially synchronized form;

wherein provision of said multimedia content from said streaming server occurs substantially independent of provision of said caption data from said caption data server; and wherein said substantial synchronization occurs based at least in part on pre-compensation of predictable delays associated with one or more required functions of said network.

2. The system of claim 1, wherein said packet-switched network comprises the Internet, and said system further comprises:

a messaging server in communication with said caption data server;

a web server; and an authentication server;

wherein said at least one client device runs a messaging client application; said application in data communication with at least said messaging server and said web server.

3. The system of claim 2, wherein said at least one client device is further configured to run a video player application thereon, said video player application being configured to play at least a portion of said content, and said messaging client application displays at least a portion of said caption data.

4. The system of claim 1, wherein said caption data comprises vertical blanking interval (VBI) caption data, and said packet-switched network comprises an Internet Protocol (IP) transport.

5. The system of claim 1, wherein said packet-switched network comprises at least portions of hybrid fiber coax (HFC) cable network comprising at least one cable modem interposed between said streaming server and said at least one client device.

6. A method of delivering caption data to one or more client devices in a packet-switched network, said network comprising at least one multimedia server configured to send one or more multimedia programs, at least one caption data server, at least one authentication server, and a plurality of client devices in direct or indirect signal communication with said servers, said method comprising:

said at least one caption data server sending a message to said at least one authentication server including information identifying one of said plurality of client devices;

receiving a response to said message, said response indicating a service level of said one of said plurality of client devices; and based at least in part on said service level of said one of said plurality of client devices:

extracting said caption data from said one or more multimedia programs;

buffering said caption data for a first duration;

formatting said caption data in a format suitable for transport over said network; and delivering said caption data to said one of said plurality of client devices over said network via said at least one caption data server, said at least one caption data server comprising a separate entity than said at least one multimedia server configured to send said one or more multimedia programs;

wherein said response is based at least in part on an authentication message, said authentication message being sent via an instant messaging-based mechanism.

7. The method of claim 6, wherein said act of buffering is performed based at least in part on a format of a video codec used to encode or decode said one or more multimedia programs.

8. The method of claim 6, wherein said act of formatting comprises creating multiple packet formats for the same data, said packet formats being selected to meet one or more requirements associated with said one of said plurality of client devices.

9. The method of claim 6, wherein said act of delivering is performed via an Internet Protocol (IP) transport for said caption data different from that for said multimedia programs.

10. The method of claim 6, wherein said act of delivering is performed via an Internet Protocol (IP) transport for said caption data identical to that for said one or more multimedia programs.

11. A network server apparatus for use in an Internet Protocol (IP) delivery network comprising a plurality of client devices, said apparatus comprising:

an extraction unit configured to remove caption data from incoming television signals;

a storage unit configured to buffer said removed caption data;

a formatting unit configured to process said removed caption data; and a delivery unit configured to:

switch off a broadcast of said caption data when there are no requests to receive said caption data from said plurality of client devices;

broadcast said caption data as a unicast only to said number of said plurality of client devices that request to receive said caption data when a number of said plurality of client devices that request to receive said caption data is below a threshold; and broadcast said caption data as a multicast to said number of said plurality of client devices that request to receive said caption data when said number of said plurality of client devices that request to receive said caption data meets or exceeds a threshold.

12. The apparatus of claim 11, wherein said formatting unit is further configured to: convert said incoming television signals to a format suitable for transmission over said IP delivery network.

13. The apparatus of claim 11, wherein said delivery unit further comprises a server entity separate from said apparatus and in communication with said apparatus, said server entity configured to run a distributed software application.

14. The apparatus of claim 11, wherein if said incoming television signals comprise a digital transport stream, said extraction unit further adapted to extract said caption data from said stream via a separate MPEG program ID (PID), and said formatting unit further adapted to convert said removed caption data to a format suitable for transmission over said IP delivery network.

15. The apparatus of claim 11, wherein said extraction unit is further configured to calculate a time reference associated with said caption data in order to permit synchronization of said caption data with an associated video content.

16. The apparatus of claim 11, wherein if said incoming television signals comprise analog signals, said extracting unit being further adapted to extract said caption data into a digital format.

17. The system of claim 1, wherein said caption data comprises data related to a context of said multimedia content.

18. A method of delivering caption data to one or more client devices in a packetized delivery network comprising at least one multimedia server configured to send multimedia programs, and at least one data server configured to send said caption data associated with one or more of said multimedia programs, said one or more client devices in direct or indirect signal communication with said servers, said method comprising:

extracting said caption data from said one or more multimedia programs;

formatting said caption data to generate multiple formats for said caption data, said formats comprising exact copies of said caption data generated to meet one or more requirements associated with individual ones of said one or more client devices;

broadcasting said one or more multimedia programs to said one or more client devices over a first transport stream associated with a first process running on said one or more client devices, said first transport stream being generated by said at least one multimedia server;

receiving a selection of at least one of said multiple formats of said caption data from one of said one or more client devices;

broadcasting said caption data in said selected at least one format as a unicast or a multicast to said one of said one or more client devices over a second transport stream different from said first transport stream and associated with a second process running on said one of said one or more client devices on which said first process is running, said second transport stream being generated by said at least one data server; and causing said caption data to be displayed using at least said second process while one or more of said multimedia programs are displayed using at least said first process;

wherein said at least one data server is further in communication with at least one second network, for delivery of said caption data to said at least one second network as well;

wherein in an absence of said receipt of said selection of said at least one of said multiple formats of said caption data, broadcast of said caption data is switched off; and wherein said unicast or said multicast is determined based at least in part on a number of said one or more client devices selecting to receive said one of said multiple formats of said caption data.

19. A method of delivering media content and caption data to a client device in a packet delivery network comprising at least one media content server, at least one caption server, said method comprising:

receiving a broadcast of said media content at said client device over a first transport associated with a first process running on said client device, said first transport being generated by said at least one media content server;

providing at least information identifying said client device to at least one caption data server, said at least one caption data server providing said information to an authentication entity in communication therewith and receiving in response thereto a response indicating a service level of said client device;

based at least in part on said service level of said client device, receiving from said at least one caption server said caption data over a second transport different from said first transport and associated with a second process running on said client device, said second transport being generated by said at least one caption server; and causing said caption data to be displayed using at least said second process while said media content is displayed using at least said first process in a substantially synchronized form;

wherein said substantial synchronization occurs based at least in part on pre-compensation of predictable delays associated with one or more required functions of said network.

wherein said first transport comprises a transport carried by a managed content distribution network and said second transport comprises a transport carried via an Internet connection; and wherein said at least one caption data server is configured to receive said media content and extract said caption data therefrom.

20. The method of claim 19, wherein said caption data received from said at least one caption server comprises caption data in a plurality of different formats.

21. The method of claim 19, wherein said second transport stream comprises transport associated with instant messaging (IM) technology.

22. The method of claim 18, wherein at least one of said packetized delivery network and said second network comprises a managed content distribution network.

\* \* \* \* \*